US009692596B2

(12) United States Patent
Dash

(10) Patent No.: US 9,692,596 B2
(45) Date of Patent: *Jun. 27, 2017

(54) BLUESALT SECURITY

(71) Applicant: International Business Machines Corporation, Armonk, NY (US)

(72) Inventor: Samir K. Dash, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,207

(22) Filed: Jan. 3, 2017

(65) Prior Publication Data
US 2017/0111168 A1   Apr. 20, 2017

Related U.S. Application Data

(63) Continuation of application No. 15/078,142, filed on Mar. 23, 2016, which is a continuation of application No. 14/843,390, filed on Sep. 2, 2015.

(51) Int. Cl.
*G06F 21/00* (2013.01)
*H04L 9/08* (2006.01)
(Continued)

(52) U.S. Cl.
CPC .......... *H04L 9/0863* (2013.01); *H04L 9/0643* (2013.01); *H04L 9/14* (2013.01); *H04L 9/3226* (2013.01); *H04L 63/0428* (2013.01)

(58) Field of Classification Search
CPC ..... G06F 21/602; G06F 21/62; H04L 63/083; H04F 9/0861; H04F 9/3226;
(Continued)

(56) References Cited

U.S. PATENT DOCUMENTS 5,210,795 A    5/1993 Lipner
5,787,169 A    7/1998 Eldridge et al.
(Continued)

FOREIGN PATENT DOCUMENTS

EP    2339777 A2    6/2011

OTHER PUBLICATIONS

Balakrishnan, "Efficiency of Biometric integration with Salt Value at an Enterprise Level and Data Centres," Sutherland Global Services, India, 2011, 26 pages.
(Continued)

*Primary Examiner* — Jeffrey Pwu
*Assistant Examiner* — William Corum, Jr.
(74) *Attorney, Agent, or Firm* — Kristofer L. Haggerty

(57) ABSTRACT

Embodiments of the present invention disclose a method, system, and computer program product for bluesalt security. A computer receives a confidential data configuration wherein specific sensor are assigned to specific confidential information. The assigned sensors are measured for values as a system administrator enters a password corresponding to the confidential information. The measured values are converted into a salt and concatenated with the password to generate a primary key. The primary key is used to encrypt the confidential information, then the primary key is encrypted using a secondary key comprised of a second password with a second set of sensor information as the salt. The encrypted key is saved securely while the secondary key is destroyed. In order to decrypt the confidential information, a user must replicate the password and sensor values to generate the primary or secondary key.

1 Claim, 5 Drawing Sheets

(51) Int. Cl.
*H04L 9/32* (2006.01)
*H04L 9/06* (2006.01)
*H04L 9/14* (2006.01)
*H04L 29/06* (2006.01)

(58) Field of Classification Search
CPC .. H04F 9/3236; H04F 9/3242; H04F 63/0435; H04F 63/08
See application file for complete search history.

(56) References Cited

U.S. PATENT DOCUMENTS

| | | | |
|---|---|---|---|
| 6,178,508 | B1 | 1/2001 | Kaufman |
| 7,197,765 | B2 | 3/2007 | Chan et al. |
| 7,716,722 | B2 | 5/2010 | Swift et al. |
| 8,391,488 | B2 | 3/2013 | Qiu et al. |
| 8,687,814 | B2 | 4/2014 | Nord et al. |
| 8,769,637 | B2 | 7/2014 | Janzen |
| 9,208,302 | B2 | 12/2015 | Kannavara et al. |
| 2002/0087890 | A1* | 7/2002 | Chan ............... G06F 21/41 726/5 |
| 2003/0185391 | A1 | 10/2003 | Qi et al. |
| 2006/0255910 | A1 | 11/2006 | Fukushima et al. |
| 2007/0223691 | A1 | 9/2007 | Takashima et al. |
| 2007/0245152 | A1 | 10/2007 | Pizano et al. |
| 2008/0016576 | A1 | 1/2008 | Ueda et al. |
| 2008/0120504 | A1 | 5/2008 | Kirkup et al. |
| 2008/0235772 | A1* | 9/2008 | Janzen ............. G06F 21/31 726/5 |
| 2011/0022847 | A1 | 1/2011 | Duffy et al. |
| 2011/0252243 | A1 | 10/2011 | Brouwer et al. |
| 2013/0055381 | A1 | 2/2013 | Hao et al. |
| 2014/0095884 | A1* | 4/2014 | Kannavara ........ G06F 21/32 713/186 |
| 2014/0101447 | A1 | 4/2014 | Lekies et al. |
| 2014/0139318 | A1 | 5/2014 | Malpani et al. |
| 2014/0237246 | A1 | 8/2014 | Brown et al. |
| 2014/0281568 | A1* | 9/2014 | Ross .............. G06F 21/32 713/186 |
| 2015/0172272 | A1* | 6/2015 | Levner ............ H04L 63/083 726/7 |
| 2016/0171199 | A1 | 6/2016 | Beatson et al. |
| 2016/0269178 | A1 | 9/2016 | Yang et al. |
| 2016/0294562 | A1 | 10/2016 | Oberheide et al. |

OTHER PUBLICATIONS

Rao, "Method for securing password and user credentials," ip.com, IP.com No. 000240441, Jan. 30, 2015, 7 pages.

Richards; "One-Time Password (OTP) Pre-Authentication (RFC6560)," ip.com, IP.com No. 000216439, IP.com Electronic Publication: Apr. 7, 2012, 87 pages.

(Abstract Only) Mannan et al., "Reducing threats from flawed security APIs: The banking PIN case," Computers and Security, vol. 28, Issue 6, Sep. 2009, Elsevier Advanced Technology Publications Oxford, UK, doi>10.1016/j.cose.2009.01.006, 2 pages.

IBM: List of IBM Patents or Patent Applications Treated as Related (Appendix P), Jan. 5, 2017, pp. 1-2.

Dash, Pending U.S. Appl. No. 14/843,390, filed Sep. 2, 2015, titled "Bluesalt Security," pp. 1-35.

Dash, Pending U.S. Appl. No. 15/078,142, filed Mar. 23, 2016, titled "Bluesalt Security," pp. 1-29.

Dash, Pending U.S. Appl. No. 15/397,217, filed Jan. 3, 2017, titled "Bluesalt Security," pp. 1-29.

* cited by examiner

BLUESALT SECURITY

TECHNICAL FIELD

The present invention relates generally to securing information, and more particularly to incorporating additional environment factors in the salt of a cryptographic key.

BACKGROUND

Security systems are widely used around the world. Current security systems utilize measures such as keys (electronic or physical), access codes, login credentials, and physical characteristics such as retina or fingerprint scans. While these methods prove sufficient for many applications, the aforementioned methods do not take into consideration environmental factors such as location, time, date, temperature, or other factors pertaining to an access request. These additional factors are capable of increasing security measures in instances when, for example username/password information is compromised, by preventing access to data without satisfying the additional environment factors.

SUMMARY

Embodiments of the present invention disclose a method, system, and computer program product for bluesalt security. A computer receives a confidential data configuration wherein specific sensor are assigned to specific confidential information. The assigned sensors are measured for values as a system administrator enters a password corresponding to the confidential information. The measured values are converted into a salt and concatenated with the password to generate a primary key. The primary key is used to encrypt the confidential information, then the primary key is encrypted using a secondary key comprised of a second password with a second set of sensor information as the salt. The encrypted key is saved securely while the secondary key is destroyed. In order to decrypt the confidential information, a user must replicate the password and sensor values to generate the primary or secondary key.

DETAILED DESCRIPTION

Embodiments of the present invention will now be described in detail with reference to the accompanying figures.

Figure 1:
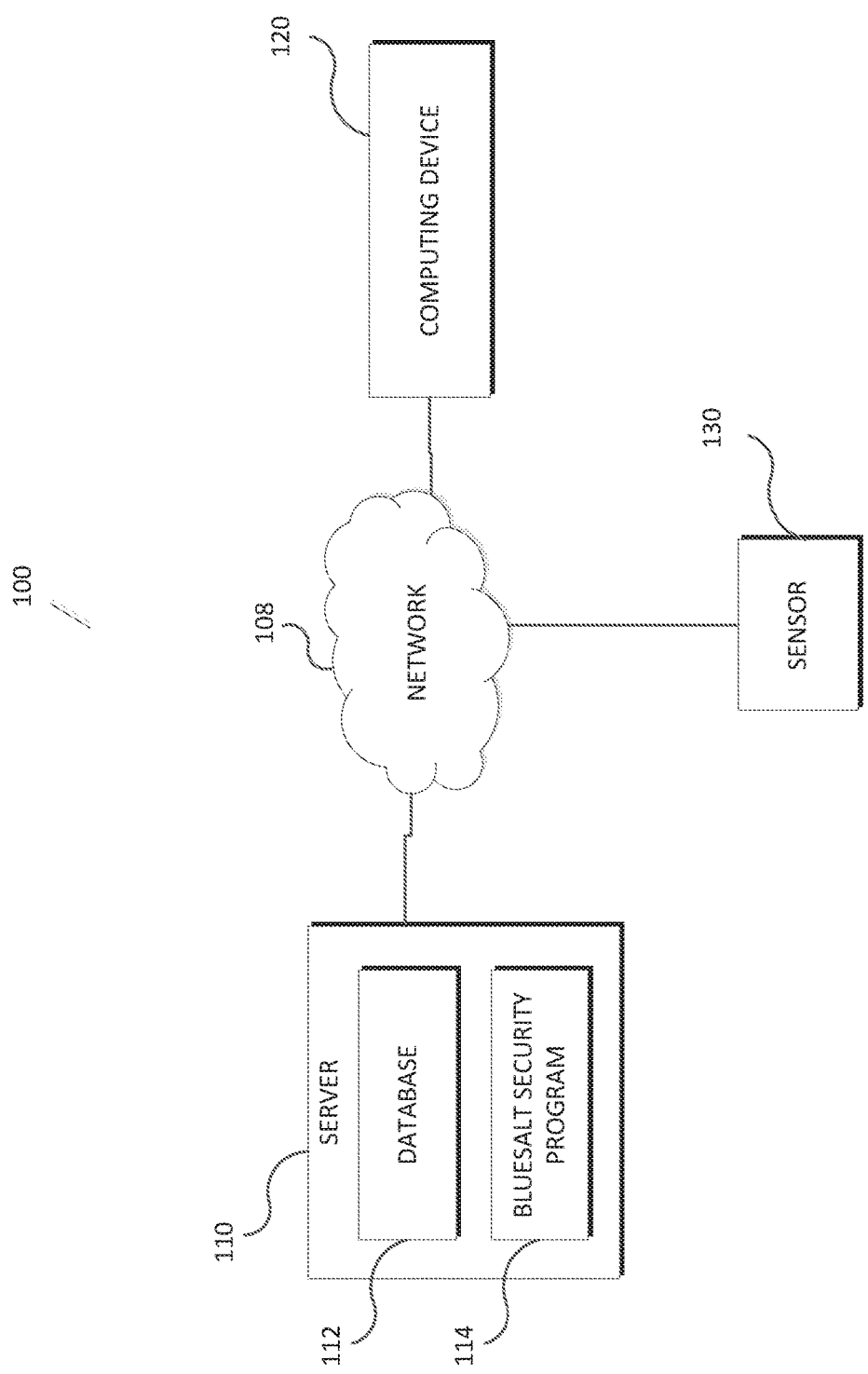
FIG. 1 illustrates a bluesalt security system, in accordance with an embodiment of the invention.

FIG. 1 illustrates a bluesalt security system 100, in accordance with an embodiment of the invention. In the example embodiment, bluesalt security system 100 includes server 110, network 108, computing device 120, and sensor 130.

In the example embodiment, network 108 may be the Internet, representing a worldwide collection of networks and gateways to support communications between devices connected to the Internet. Network 108 may include, for example, wired, wireless or fiber optic connections. In other embodiments, network 108 may be implemented as an intranet, a local area network (LAN), or a wide area network (WAN). In general, network 108 can be any combination of connections and protocols that will support communications between server 110, computing device 120, and sensor 130.

Computing device 120 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 120 is shown as a single device, in other embodiments, computing device 120 may be comprised of a cluster or plurality of computing devices, working together or working separately. Computing device 120 is described in further detail with reference to FIG. 5.

Sensor 130 is a device capable of measuring a characteristic of an environment. In the example embodiment, sensor 130 may be a clock, calendar, gyroscope, accelerometer, compass, global positioning system (GPS), pressure sensor, barometer, thermometer, humidity sensor, proximity sensor, camera, microphone, light sensor, or other device used for measuring an environment or current state. Furthermore, in the example embodiment, sensor 130 may be a device capable of detecting local connection points such as an internet protocol (IP) address, a Wi-Fi connection, a Bluetooth connection, a network connection, an infrared connection, or a near field communication (NFC). Sensor 130 may additionally be a device capable of detecting biometric information of an individual utilizing techniques such as facial recognition, iris scanning, voice recognition, and fingerprint scanning. In the example embodiment, sensor 130 is referenced via network 108, however in other embodiments, sensor 130 may be referenced locally.

Server 110 includes database 112 and bluesalt security program 114. In the example embodiment, key server 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While server 110 is shown as a single device, in other embodiments, server 110 may be comprised of a cluster or plurality of computing devices, working together or working separately. Server 110 is described in more detail with reference to FIG. 5.

Database 112 is an organized collection of data. In the example embodiment, database 112 contains confidential information that is encrypted and decrypted by bluesalt security program 114. In the example embodiment, database 112 is present on server 110, however, in other embodiments, database 112 may be present on another computing device connected to server 110 via network 108.

Bluesalt security program 114 is a program capable of receiving a password from a user on a computing device, such as computing device 120. Bluesalt security program 114 is additionally capable of referencing a measured value from a sensor, such as sensor 130, and converting that value into a salt. In cryptography, a salt is a random data value(s) that is used as an additional input to a one-way function that hashes a password, increasing the difficulty for a hacker to hack a password (hashing is described in greater detail below). For example, a single-bit salt adds a 0 or 1 to a password, requiring a hacker to guess the password while incorporating a 0 or a 1. Therefore, if a single bit salt is applied to the password "Birthdate", the hacker must try every password attempt three times (Birthdate, Birthdate0, and Birthdate1) instead of once, increasing the difficulty and time required for a successful hack. Even if a hacker knows a single-bit salt is incorporated, it may still double the amount of attempts necessary to successfully hack the password (Birthdate0, Birthdate1). Similarly, a two-bit salt increases the difficulty of guessing a password fourfold (Birthdate00, Birthdate01, Birthdate10, Birthdate11), and so forth. Bluesalt security program 114 is further capable of concatenating and processing the received password and converted salt with a cryptographic hash function into a hash key. Bluesalt encryption program is additionally capable of using the hash key to encrypt and decrypt confidential information, such as the information contained in database 112.

Figure 2:
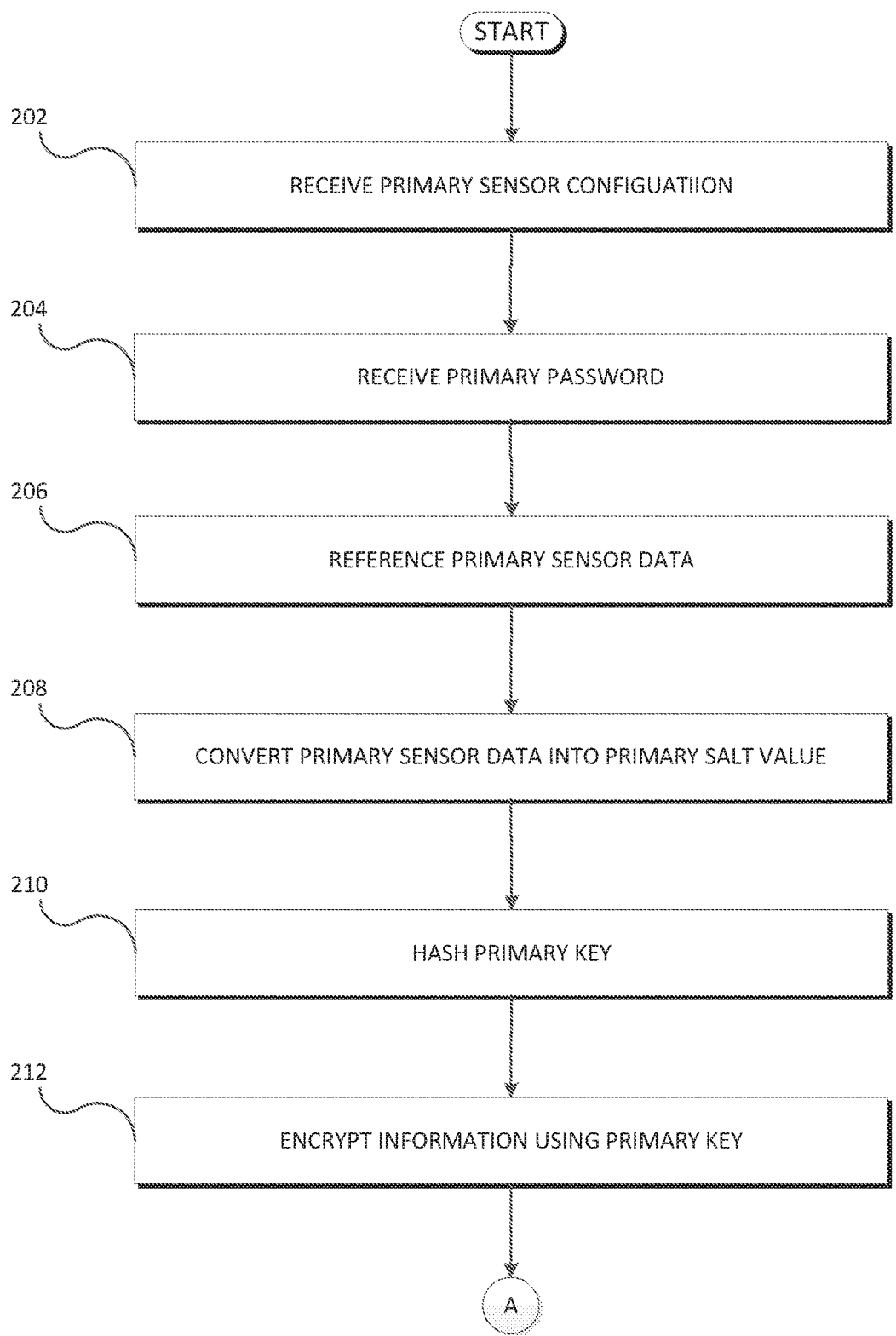
FIG. 2 is a flowchart illustrating the operations of the bluesalt security program 114 of FIG. 1 in configuring bluesalt security program 114 for a primary user.

FIG. 2 is a flowchart depicting the operations of bluesalt security program 114 in configuring encryption parameters for a primary user. A system administrator configures bluesalt security program 114 by designating a primary password and the primary environmental factors present to gain access to confidential information. The primary environmental factors measured during configuration, such as temperature or time, are added to the primary password as a primary salt before the two are concatenated and hashed into a primary cryptographic key. The primary cryptographic key is used to encrypt the confidential information symmetrically before the primary salt values and primary cryptographic key are deleted permanently. In order to gain access to the confidential information, a user must enter the designated primary password, retrieve acceptable primary environmental values from sensor(s) 130, and hash an identical primary key to decrypt the encrypted information.

In the example embodiment, bluesalt security program 114 receives the primary sensor configuration of the security system from a system administrator via a user input (step 202). The primary sensor configuration details the conditions which must be present for access to confidential information stored in database 112. In the example embodiment, the primary sensor configuration details the primary environmental measurements that provide the values used to generate the primary salt added to the primary password (salt is described in greater detail below). In the example embodiment, a system administrator may vary the primary sensor configuration for the confidential information by assigning specific environmental factors to be measured upon login by the primary user. For example, if the primary sensor configuration for file Confidential requires a password, a specific temperature measurement by a specific thermometer, and an access request at specific coordinates measured by a GPS, then a system administrator designates the specific thermometer and a GPS device as the sensors whose values must be measured upon an access request to file Confidential. In the example embodiment, the primary sensor configuration is associated with the confidential information and stored locally on server 110, however in other embodiments, the primary sensor configuration may be associated with individuals or devices. In the example embodiment, the primary sensor configuration is stored locally on server 110, however in other embodiments, bluesalt security program 114 may retrieve the primary sensor configuration from another computing device via network 108.

Bluesalt security program 114 receives the primary password designated for the primary user by a system administrator (step 204). In the example embodiment, bluesalt security program 114 encrypts the confidential information using a symmetrical cryptographic key algorithm, meaning that the same hash key used to encrypt confidential information is used to decrypt the encrypted confidential information. Because the hash keys must be identical, then the password and salt used to make the hash keys must, too, be identical. Thus, a system administrator encrypts the confidential information by first entering the primary password that will later be used by the primary user(s) to decrypt the confidential information. Continuing the example above using the file Confidential, if the system administrator wants the primary user to decrypt the confidential information using the password "Birthdate", then the system administrator enters the password "Birthdate" when encrypting the confidential information.

Bluesalt security program 114 references primary sensor data from sensor 130 corresponding to each of the environmental factors designated to provide a primary salt in step 202 (step 206). In order to generate identical hash keys at both encryption and decryption, the salt used to generate the hash keys must, too, be identical at encryption and decryption. In the example embodiment, bluesalt security program 114 references sensor data by communicating with sensor 130 for each of the designated primary environmental factors. Scrutiny of the referenced values may be varied by a system administrator through means such as rounding to specific decimal places or whole numbers. Additionally, values measured at configuration may be given a tolerance (such as ±1 degree in temperature or location), effectively creating a range and relaxing scrutiny. If a system administrator is unable to replicate desired encryption conditions at the time of encryption, the admin may input the specific values which need be present via a user interface. Continuing the example above, if a system administrator designates the environmental factors added as a salt to the password "Birthdate" as the values measured on the thermometer and GPS device, then bluesalt security program 114 communicates with the thermometer and GPS device to obtain the measured values.

Bluesalt security program 114 converts the primary sensor data into a primary salt value (step 208). In the example embodiment, environmental values measured by sensor 130 are used as the salt added to a password protecting confidential information. In the example embodiment, the values (which will vary in digits and size depending on the field of measurement, sensitivity of sensor 130, and preferred rounding of the administrator) are input into a predefined function which converts the values into a desired format. In the example embodiment, the predefined function converts the values into a hex string of specific length and bits. In other embodiments, other predefined functions may be utilized to convert the referenced environmental values into any length strings and any-bit salts. Referencing the example above, if bluesalt security program 114 references the thermometer to measure a temperature reading of 68° Fahrenheit in the environment of computing device 110 and the GPS to measure coordinates of computing device 110 as 40° latitude and −74° degrees longitude, then bluesalt security program 114 converts the values into the hex string 33312e34b043 using a predefined function.

Bluesalt security program 114 generates a primary key by hashing and concatenating the primary password and primary salt value (step 208). In cryptography, hashing is similar to encryption in that a sequence of characters (the message) is converted to other characters (the digest) in order to maintain confidentiality. However, unlike encryption where an encrypted message can be decrypted, the process of hashing is irreversible and cannot be "de-hashed." An ideal hashing function should make it easy to compute a hash for any given message, infeasible to generate an original message from its hash, infeasible to modify a message without altering its hash, and infeasible to generate the same hash for two different messages. In the example embodiment, the primary password and primary salt value is hashed and the outputs are concatenated (combined) into a primary key. The hashing is irreversible and, therefore, the primary password and primary salt (the message) cannot be reverse generated using the primary key. Continuing the example above, if bluesalt security program 114 concatenates and hashes the password "Birthdate" with the hex string 33312e34b0413, then bluesalt security program 114 generates the primary key 5hJ8fh3jefHGifnJ.

Bluesalt encryption program 114 encrypts the confidential information using the primary key hashed in step 210 (step 212). In the example embodiment, bluesalt security program 114 encrypts the confidential information by applying a predefined encrypting function using the primary key to the confidential information. For example, bluesalt security program 114 encrypts the confidential information using the primary key 5hJf8fh3jefHGifnJ generated above. In the example embodiment, bluesalt security program 114 deletes the primary password, the primary salt, and the primary key after encrypting the confidential information with the primary key—necessitating the exact replication of the password and salt used to generate the primary key which can decrypt the confidential information. However, as a precaution in the case the primary key cannot be replicated (for example, if the primary environmental factors cannot be exactly replicated), the primary key is encrypted using a secondary key comprising of a secondary password and secondary salt before the primary key is deleted. By encrypting the primary key into an encrypted key, replicating the secondary key allows a user to decrypt the encrypted key back into the primary key when replication of the primary key using the primary password and primary salt is infeasible. This process is described below in FIG. 3.

Figure 3:
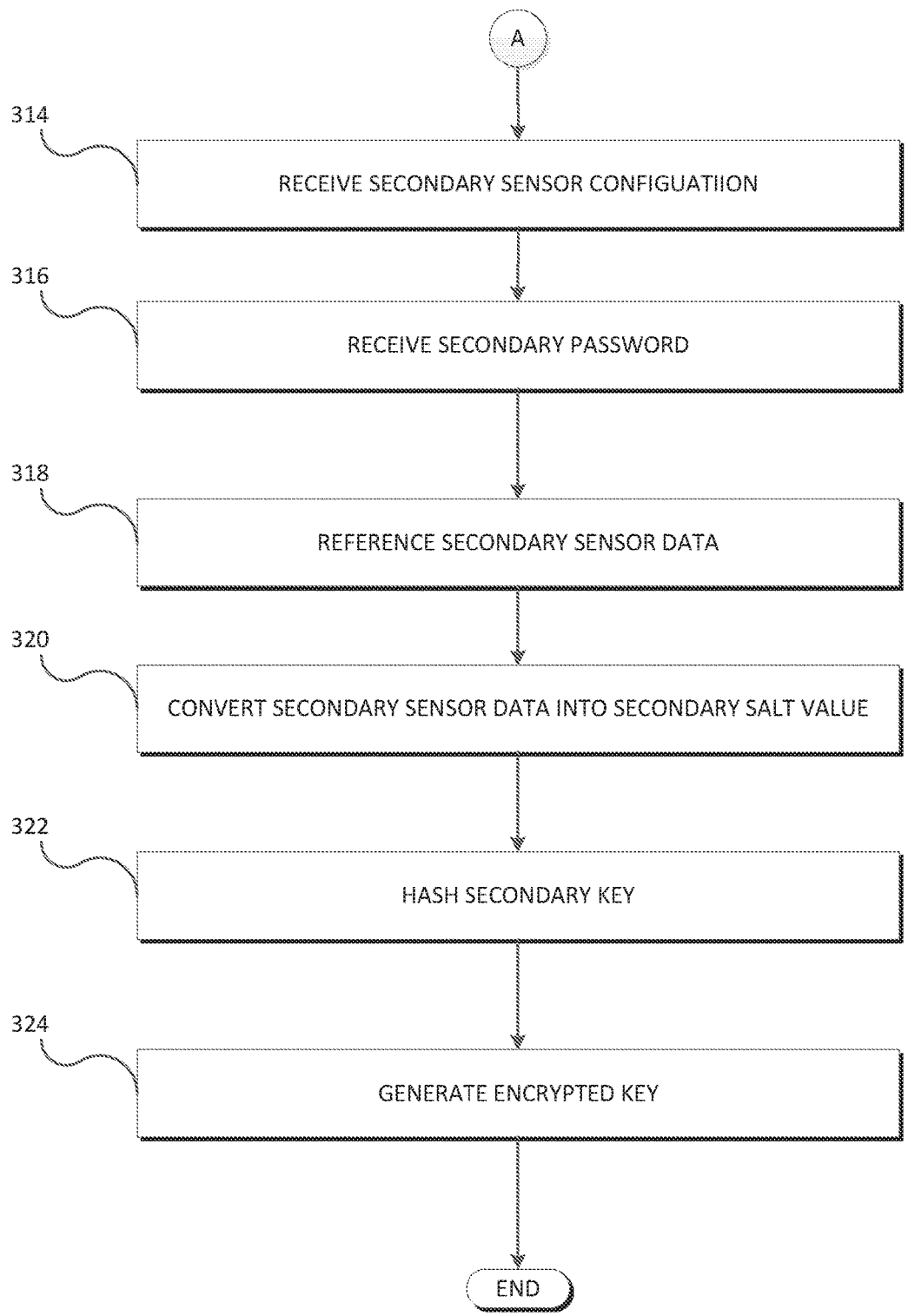
FIG. 3 continues the flowchart of FIG. 2 illustrating the operations of the bluesalt security program 114 of FIG. 1 in configuring bluesalt security program 114 for secondary access.

FIG. 3 is a flowchart depicting the operations of bluesalt security program 114 in configuring encryption parameters for secondary access to the confidential information. Configuring bluesalt security program 114 for secondary access acts as a backup in the case the primary key cannot be replicated due to an incorrect primary password or incorrect primary salt. The secondary key, which is generated using a secondary password and secondary salt, is used to encrypt the primary key generated in FIG. 2 before the primary key is disposed of. The resulting output is known as the encrypted key and is stored securely (unlike the primary salt, primary password, primary key, secondary salt, secondary password, and secondary key, the encrypted key is the only information saved by bluesalt security program 114 other than the encrypted, confidential information). This is a measure to increase security. Because the encrypted key is encrypted symmetrically, replicating the secondary key makes it possible to decrypt the encrypted key back into the primary key, which can then decrypt the confidential information. Thus, even when the primary key cannot be replicated, the secondary key may be replicated and used to decrypt the encrypted key back into the primary key, allowing a user to decrypt the confidential information. This process is described in greater detail below.

Bluesalt security program 114 receives the secondary sensor configuration in much the same way as bluesalt security program 114 receives the primary sensor configuration described in step 202 (step 314). Here, however, a system administrator is designating the environmental factors to be measured for secondary, or backup, access.

Bluesalt security program 114 receives the secondary password in much the same way as bluesalt security program 114 receives the primary password described in step 204 (step 316).

Bluesalt security program 114 references secondary sensor data in much the same way as bluesalt security program 114 references primary sensor data described in step 206 (step 318).

Bluesalt security program 114 converts the secondary sensor data into a secondary salt value in much the same way as bluesalt security program 114 converts the primary sensor data into the primary salt value described in step 206 (step 320).

Bluesalt security program 114 hashes a secondary key using the secondary salt value and the secondary password in much the same manner that bluesalt security program 114 hashes the primary key using the primary salt value and primary password above (step 322).

Bluesalt security program 114 generates an encrypted key by encrypting the primary key with the secondary key using a predefined encrypting function in much the same way bluesalt security program 114 encrypts the confidential information above (step 324). In the example embodiment, the encrypted key is encrypted symmetrically, meaning that it can only be decrypted with an identical key. In the example embodiment, bluesalt security program 114 destroys the secondary key and stores the encrypted key in a secure location remotely or locally. In the case the primary key cannot be replicated, the secondary key must be re-generated by way of the exact replication of the secondary password and secondary salt value used to encrypt the encrypted key. Decrypting the encrypted key will output the primary key, which can then be used to decrypt the confidential information.

Figure 4:
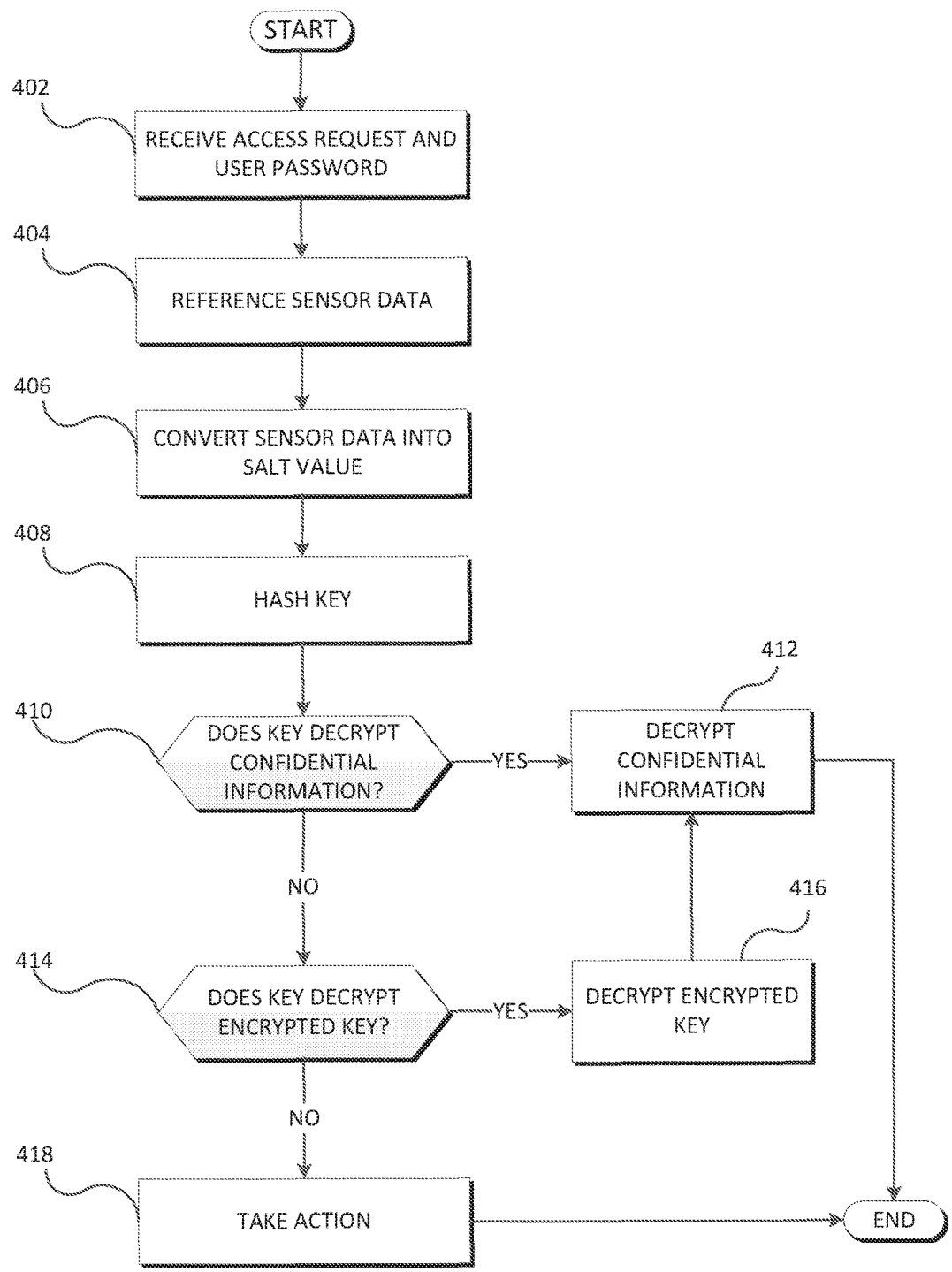
FIG. 4 is a flowchart illustrating the operations of bluesalt security program 114 of FIG. 1 in evaluating a request to access encrypted information secured by bluesalt security program.

FIG. 4 is a flowchart depicting the operations of bluesalt security program 114 in evaluating a request for access to confidential information stored in database 112. In order to gain access to the confidential information, a user must either replicate the primary key to decrypt the confidential information or replicate the secondary key to decrypt the encrypted key back into the primary key, then decrypt the confidential information.

Bluesalt security program 114 receives an access request and password entered through a user interface (step 402). The access request includes which resource (files, folders, documents, etc.) of confidential information a user is requesting access to. For example, the user may request access to a file Confidential and input the password: Birthdate.

Bluesalt security program 114 references sensor data of each of sensor 130 in much the same way bluesalt security program 114 references sensor data when generating the primary and secondary key above (step 404). Continuing the example above where a system administrator selected a temperature reading and location coordinates as the environmental factors associated with file Confidential, bluesalt security program 114 references the corresponding thermometer and GPS device in order to determine a current temperature reading and GPS coordinates in the environment from which access to the confidential information is requested.

Bluesalt security program 114 converts the sensor data into a salt value using a predefined function similar to the manner it is described in step 208 of the FIG. 2 discussion (step 406).

Bluesalt security program 114 hashes a key using the provided password and referenced salt values in much the same manner bluesalt security program 114 hashes a primary and secondary key above (step 408).

Bluesalt security program 114 determines whether the hashed key decrypts the confidential information (decision 410). Bluesalt security program 114 determines whether the hashed key decrypts the confidential information by attempting to decrypt the confidential information and monitoring the results. If the hashed key does not decrypt the confidential information, the output of the program will be nonsensical (garbage). Not only is the garbage useless to hackers, but subsequent processes depending on a sensible output will be unable to operate properly and, as a result, bluesalt security program 114 can deduce that the hashed key was incorrect. For example, if decryption is unsuccessful, system access to the confidential data may fail, control of any hardware may fail (such as robotics), triggering of system or application workflows may fail, communication among servers and networks may fail, and initialization of applications, systems, and sensors dependent on the confidential information may fail. From any of the aforementioned dependent systems failing, bluesalt security program 114 is capable of deducing that the hashed key was unsuccessful in decrypting the confidential information. Conversely, if the hashed key is successful in decrypting the confidential information, systems dependent on the successful decryption of the confidential information will operate properly and bluesalt security program 114 deduces that the decryption was successful.

If the hashed key decrypts the confidential information (decision 410 "YES" branch), then bluesalt security program 114 decrypts the confidential information using a predefined encryption function (step 412). In the example embodiment, the confidential information is encrypted symmetrically, meaning the same key used to encrypt the confidential information also decrypts the confidential information. Furthermore, successful decryption of the confidential information with the generated key indicates that the primary key has been replicated using the identical primary password and primary salt.

If the hashed key does not decrypt the confidential information (decision 410 "NO" branch), then bluesalt security program 114 determines whether the hashed key decrypts the encrypted key (decision 414). Bluesalt security program 114 determines whether the hashed key decrypts the encrypted key by first decrypting the encrypted key and then, in much the same manner bluesalt security program 114 determines whether the hashed key decrypts the confidential information, attempting to decrypt the confidential information.

If the hashed key decrypts the encrypted key (decision 414 "YES" branch), then bluesalt security program 114 decrypts the encrypted key back into the primary key (step 416). Bluesalt security program 114 then uses the primary key to decrypt the confidential information (step 412).

If the hashed key does not decrypt the encrypted key (decision 414 "NO" branch), then bluesalt security program 114 takes action (step 418). In the example embodiment, bluesalt security program 114 takes action by alerting security of the failed access request. In other embodiments, however, bluesalt security program 114 may secure the area or take no action.

Figure 5:
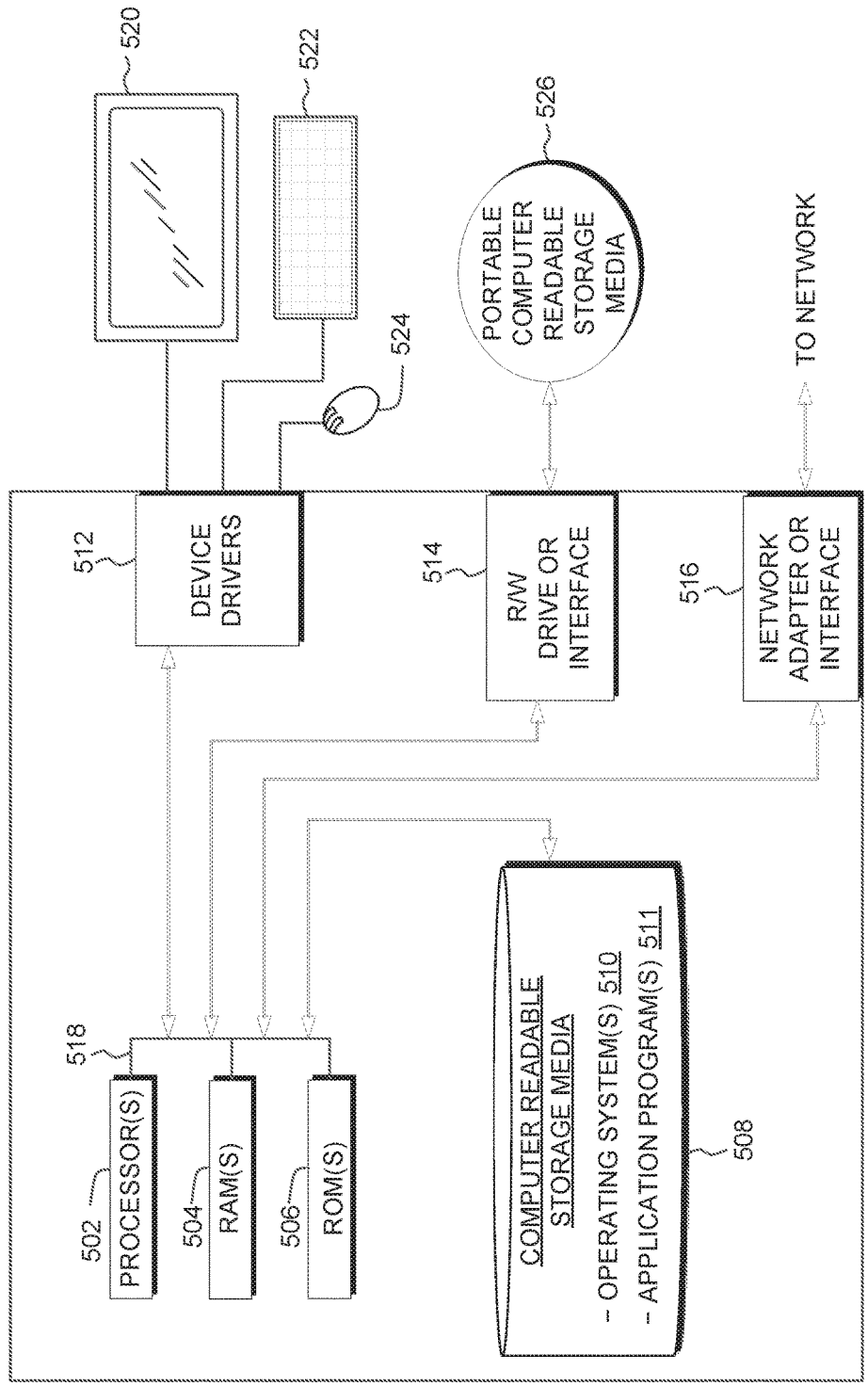
FIG. 5 is a block diagram depicting the hardware components of a bluesalt security system of FIG. 1, in accordance with an embodiment of the invention.

FIG. 5 depicts a block diagram of components of server 110 of a bluesalt security system 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Server 110 may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, bluesalt security program 114, are stored on one or more of the computer readable storage media 508 for execution by one or more of the processors 502 via one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110 may also include a R/W drive or interface 514 to read from and write to one or more portable computer readable storage media 526. Application programs 511 on server 110 may be stored on one or more of the portable computer readable storage media 526, read via the respective R/W drive or interface 514 and loaded into the respective computer readable storage media 508.

Server 110 may also include a network adapter or interface 516, such as a TCP/IP adapter card or wireless communication adapter (such as a 4G wireless communication adapter using OFDMA technology). Application programs 511 on server 110 may be downloaded to the computing device from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Server 110 may also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for a bluesalt security program, the computer program product comprising:
  one or more computer-readable storage media and program instructions stored on the one or more computer-readable storage media, the program instructions comprising:
  program instructions to encrypt data symmetrically with a primary configuration hash key, wherein the primary configuration hash key is based, at least in part, on a primary configuration password and one or more primary configuration sensor values measured by one or more primary sensors;
  program instructions to encrypt the primary configuration hash key symmetrically with a secondary configuration hash key, wherein the secondary configuration hash key is based, at least in part, on a secondary configuration password and one or more secondary configuration sensor values measured by one or more secondary sensors;
  program instructions to receive an access request to access the encrypted data from a user, wherein the access request includes a primary user password;
  program instructions to reference the one or more primary sensors to obtain one or more primary user sensor values;
  program instructions to convert the one or more primary user sensor values into a primary user salt value;
  program instructions to concatenate the primary user password and the primary user salt value into a primary user hash key;
  program instructions to determine whether the primary user hash key decrypts the encrypted data;
  based on determining that the primary user hash key does not decrypt the encrypted data, program instructions to prompt the user for a secondary user password;
  program instructions to reference the one or more secondary sensors to obtain one or more secondary user sensor values;
  program instructions to convert the one or more secondary user sensor values into a secondary user salt value;
  program instructions to concatenate the secondary user password and the secondary user salt value into a secondary user hash key;
  program instructions to determine whether the secondary user hash key decrypts the encrypted primary configuration hash key; and
  based on the determining that the secondary user hash key decrypts the encrypted primary configuration hash key, program instructions to decrypt the encrypted data with the decrypted, encrypted primary configuration hash key.

* * * * *